US006539489B1

(12) United States Patent
Reinert

(10) Patent No.: US 6,539,489 B1
(45) Date of Patent: Mar. 25, 2003

(54) APPARATUS, METHOD AND SYSTEM FOR SYNCHRONIZING SLAVE SYSTEM OPERATIONS TO MASTER SYSTEM CLOCKING SIGNALS IN A MASTER-SLAVE ASYNCHRONOUS COMMUNICATION SYSTEM

(75) Inventor: Matthias Reinert, Kalchreuth (DE)

(73) Assignee: Siemens Aktiengesellshaft, Munich (DE)

( * ) Notice: Subject to any disclaimer, the term of this patent is extended or adjusted under 35 U.S.C. 154(b) by 0 days.

(21) Appl. No.: 09/539,693

(22) Filed: Mar. 31, 2000

(51) Int. Cl.⁷ ................................................. G06F 1/12
(52) U.S. Cl. ...................................................... 713/400
(58) Field of Search ........................... 713/400; 709/248

(56) References Cited

U.S. PATENT DOCUMENTS

| 4,368,987 A | * | 1/1983 | Waters | 368/46 |
|---|---|---|---|---|
| 4,709,347 A | * | 11/1987 | Kirk | 709/248 |
| 6,023,768 A | * | 2/2000 | Shafer | 713/400 |
| 6,128,318 A | * | 10/2000 | Sato | 370/503 |
| 6,134,234 A | * | 10/2000 | Kapanen | 370/350 |

* cited by examiner

Primary Examiner—Thomas M. Heckler
(74) Attorney, Agent, or Firm—Staas & Halsey LLP

(57) ABSTRACT

A method for synchronizing a slave system and a master system, the method including the steps of providing a slave clock signal based on a communicated master clock signal, providing a time frame in the slave system, wherein the time frame is defined by a minimum time and a maximum time, and a phase of the slave clock signal corresponds to an actual time, determining if the slave clock signal is in the time frame, and regulating the slave clock signal, if it is not in the time frame, so that the slave clock signal occurs within the time frame.

37 Claims, 4 Drawing Sheets

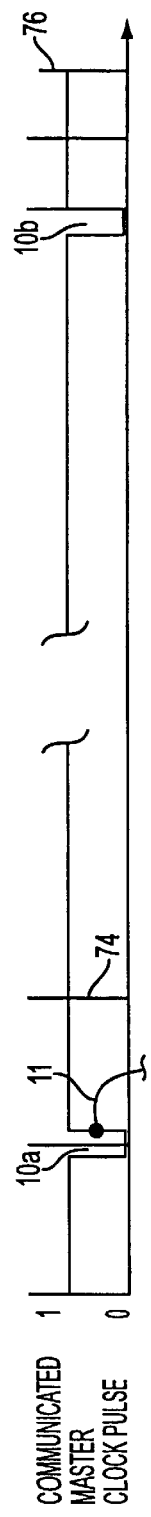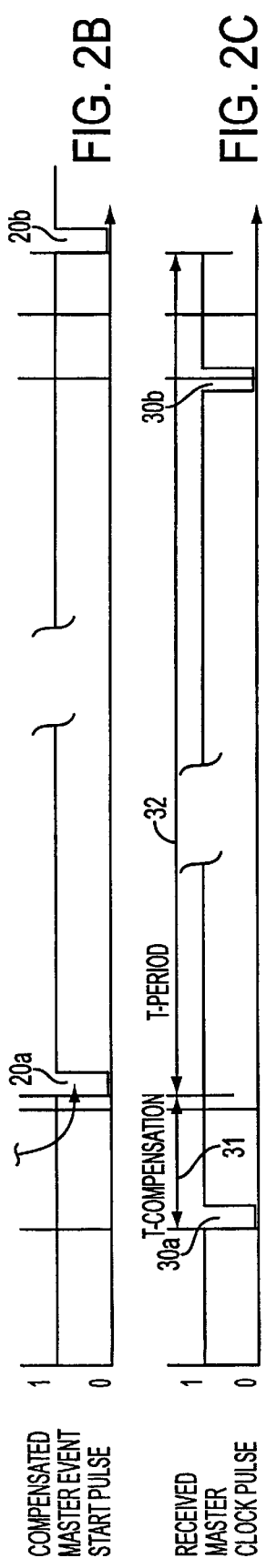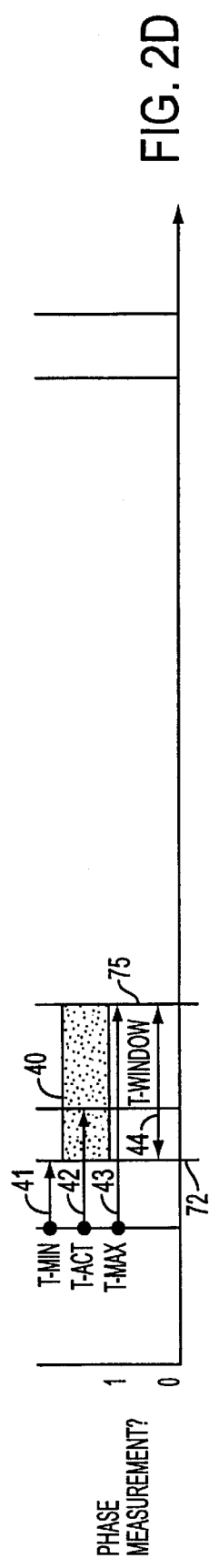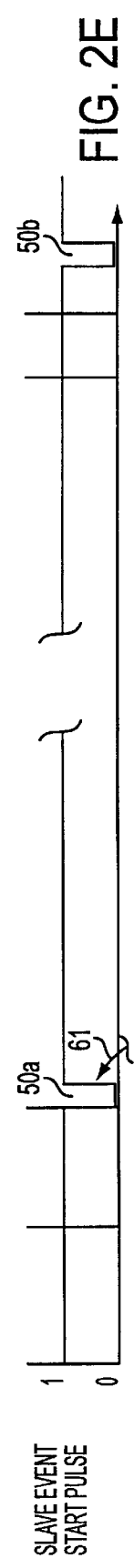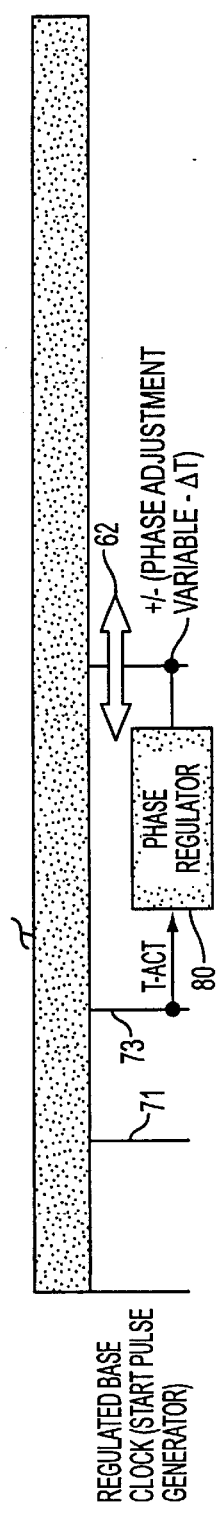

APPARATUS, METHOD AND SYSTEM FOR SYNCHRONIZING SLAVE SYSTEM OPERATIONS TO MASTER SYSTEM CLOCKING SIGNALS IN A MASTER-SLAVE ASYNCHRONOUS COMMUNICATION SYSTEM

FIELD OF THE INVENTION

The present invention is directed to an apparatus, method and system for having at least one slave system of a master-slave asynchronous communication system synchronize certain slave events or operations to master clocking signals in a master system by monitoring the phase of the master clocking signals and by regulating the slave event or clocking signals.

BACKGROUND INFORMATION

In a master-slave asynchronous communication system, which may include a master station or system (or other "source" device) and one or more slave stations or systems (or other "destination" devices), a slave system (or systems) may be used to synchronize the timing of its slave events with respect to some master clocking event or signal of the master system. In this regard, certain slave systems may use counters or programmable counter arrangements to synchronize their slave events with respect to master clocking events or signals by counting the time between the master clocking events or signals. In the master station or system, the master system has some master clocking signal having a clocking frequency or period. The master clocking signal may be used to provide a timing reference for data events or operations. The master system may use synchronization pulses to provide a timing reference for the slave system.

In particular, certain events or operations of the slave system may be synchronized to certain master clocking signals of the master system by using counter arrangements to count the time between the synchronizing pulses or other master clocking signals that correspond to the master clock cycle. In such systems, however, if the time between the master clocking events or signals increases (for example, to a time that may be on the order of about hundreds of milliseconds or even seconds), then the master clock rate may need to be decreased if the number of counters or other logic arrangements in the slave system are limited. In this regard, for example, if erasable programmable logic devices ("EPLDs") (which use "floating-gate" MOSFET technology), application specific integrated circuits ("ASICs") or other comparable devices are used, any limitations in their available logic resources (such as the number of available flip-flops) may limit the number of logic devices (such as flip-flops) that may be used to provide a sufficiently accurate counter system in the slave system. This may correspondingly limit the measurement accuracy, and may also limit the time interval or window that may be accurately measured by the phase monitoring logic in the slave system of the master-slave asynchronous communication system.

Thus, a system designer may need to compromise the design of a particular application of a master-slave asynchronous system based on the resolution requirement (which depends on the maximum phase error between the master clocking event and the corresponding slave clocking event) if there are limited logic resources (such as the number of flip-flops). It is believed, however, that such a compromise may result in reduced phase measurement accuracy when the slave system determines the phase of the master slave events to synchronize the clocking events of the slave system.

SUMMARY OF THE INVENTION

One aspect of an exemplary embodiment of a method of the present invention is directed to providing a method for synchronizing a slave system and a master system, the method including the steps of providing a slave clock signal based on a communicated master clock signal, providing a time frame in the slave system, wherein the time frame is defined by a minimum time and a maximum time, and a phase of the slave clock signal corresponds to an actual time, determining if the slave clock signal is in the time frame, and regulating the slave clock signal, if it is not in the time frame, so that the slave clock signal occurs within the time frame.

Another aspect of an exemplary embodiment of a method of the present invention is directed to providing a method for synchronizing a slave system and a master system, the method including the steps of providing a master clock signal in the master system, communicating the master clock signal to the slave system so as to provide a communicated master clock signal, providing a time frame in the slave system, wherein the time frame is defined by a minimum time and a maximum time, providing a slave clock signal based on the communicated master clock signal, wherein a phase of the slave clock signal corresponds to an actual time, determining if the slave clock signal is in the time frame, determining if the actual time is no greater than the minimum time, if the slave clock signal is not in the time frame, and regulating the slave clock signal, if it is not in the time frame, by phase shifting the slave clock signal so that it occurs after the minimum time and before the maximum time in the time frame.

Still another aspect of an exemplary embodiment of the present invention is directed to providing a system for synchronizing a slave system and a master system, the synchronizing system including a first generator that generates a time frame, wherein the time frame is defined by a minimum time and a maximum time, a second generator that generates a slave clock signal based on a communicated master clock signal, wherein a phase of the slave clock signal corresponds to an actual time, a processor that determines if the slave clock signal is in the time frame, and a regulator that regulates the slave clock signal, if it is not in the time frame, so that the slave clock signal occurs within the time frame.

Yet another aspect of an exemplary embodiment of the present invention is directed to providing a system for synchronizing a slave system and a master system, the synchronizing system including means for providing a slave clock signal based on a communicated master clock signal, wherein a phase of the slave clock signal corresponds to an actual time, means for providing a time frame, wherein the time frame is defined by a minimum time and a maximum time, means for determining if the slave clock signal is in the time frame, and means for regulating the slave clock signal, if it is not in the time frame, so that the slave clock signal occurs within the time frame.

Still another aspect of an exemplary embodiment of the present invention is directed to providing a system for synchronizing a slave system and a master system, the system including a first generator that generates a master clock signal in the master system, a communication apparatus that is adapted to communicate the master clock signal to the slave system so as to provide a communicated master clock signal, a second generator that generates a time frame in the slave system, wherein the time frame is defined by a minimum time and a maximum time, a third generator that generates a slave clock signal based on the communicated master clock signal, wherein a phase of the slave clock signal corresponds to an actual time, a processor that determines if the slave clock signal is in the time frame, and that determines if the actual time is no greater than the minimum time if the slave clock signal is not in the time frame, and a regulator that regulates the slave clock signal, if it is not in the time frame, by phase shifting the slave clock signal so that it occurs after the minimum time and before the maximum time in the time frame.

Yet another aspect of an exemplary embodiment of the present invention is directed to providing a system for synchronizing a slave system and a master system, the system including means for providing a master clock signal in the master system, means for communicating the master clock signal to the slave system so as to provide a communicated master clock signal, means for providing a time frame in the slave system, wherein the time frame is defined by a minimum time and a maximum time, means for providing a slave clock signal based on the communicated master clock signal, wherein a phase of the slave clock signal corresponds to an actual time, means for determining if the slave clock signal is in the time frame, and for determining if the actual time is no greater than the minimum time if the slave clock signal is not in the time frame, and means for regulating the slave clock signal, if it is not in the time frame, by phase shifting the slave clock signal so that it occurs after the minimum time and before the maximum time in the time frame.

BRIEF DESCRIPTION OF THE DRAWINGS

FIG. 2 shows a logic, phase and timing chart concerning the method of FIG. 1.

DETAILED DESCRIPTION

Figure 3:
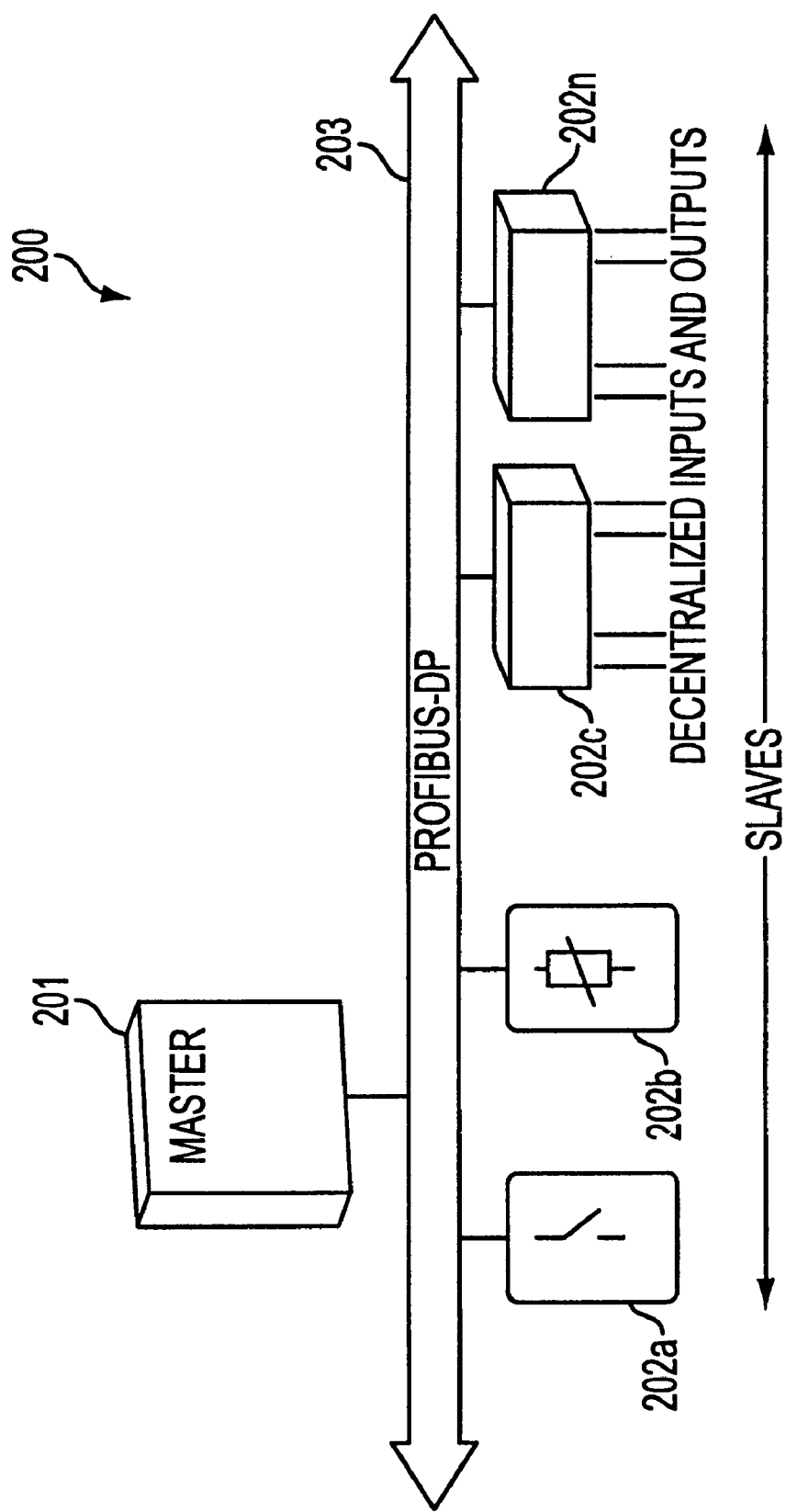
FIG. 3 shows an exemplary master-slave asynchronous communication system having one master system.

A logic, phase and timing diagram for synchronizing the phase of slave event clock pulses with respect to certain monitored master clock pulses or other master clocking signals in a master-slave asynchronous communication system is shown in FIG. 2. The master-slave asynchronous communication system 200 of FIG. 3 illustrates an example of a master-slave communication system having asynchronous capabilities. In particular, FIG. 3 shows a communication system 200, which may be a Process Field Bus ("PROFIBUS") communication system or any other suitably appropriate communication system, as an example of a master-slave asynchronous communication system. The PROFIBUS protocol of such an asynchronous communication system specifies the technical and operational characteristics of the serial field bus system, which may be used to network together decentralized controllers from the field level to the cell level. In particular, a master system 201, in asynchronous communication system 200, and master systems 251a, 251b, 251c, in asynchronous communication system 250, control the communication of encoded (cyclic redundancy coded ("CRC")) data or information on the communication buses 203 and 253, respectively. A master or active system may send messages without an external request. In the asynchronous communication system 200, slave devices or systems are peripheral devices that may include various input/output devices, such as motor drives, measuring transmitters, various actuators and sensors, as well as numerical controller units and any other suitably appropriate controllable arrangements. In particular, slave or passive systems 202a, 202b, 202c, . . . , 202n in asynchronous communication system 200, do not have bus access rights and they only send messages or receive messages to or from a master system when the master system initiates such an operation.

The PROFIBUS protocol architecture is based on the Open System Interconnection ("OSI") reference model, in which every communication or transmission layer handles certain defined tasks. In particular, the physical layer (Layer 1) defines the physical transmission characteristics, the data link layer (Layer 2) defines the bus access protocol and the application layer (Layer 7) defines the application function. In the communication system 200 of FIG. 3, the PROFIBUS bus access protocol uses a master-slave procedure, which may be used by the master system to communicate with the slave or passive systems. In particular, the master-slave procedure permits the active or master system to access the assigned slave or passive systems. The master system may send messages to each or all of the slave systems or read messages from any of the slave systems in the communication system 200 of FIG. 3. The slave systems 202a, 202b, 202c, . . . , 202n in asynchronous communication system 200 may operate in a synchronized mode when the master system sends an appropriate command to the slave systems, and to which the slave systems may synchronize their slave events or operations.

As further regards FIG. 2, the vertical axis 5 represents the voltage characteristics of various master and slave clock pulses or signals. As shown on the phase axis A, which is labeled "Communicated Master Clock Pulse", the master system 201 may use its master clock to generate a master clock pulse 10a to initiate some activity or event at the master system 201 and at one or more of the slave systems 202a, 202b, 202c, . . . , 202n in the master-slave asynchronous communication system 200. The master clock pulse 10a is based on a running master clock cycle of the master system 201 and is asynchronously communicated to one or more of the slave systems 202a, 202b, 202c, . . . , 202n on the communication bus 203. Next, as shown on the phase axis B, which is labeled "Phase Compensated Master Event Start Pulse", the master system 201 may use its own master clock pulse 10a of the phase axis A to generate or regenerate its own phase-compensated master event start pulse 20a. In particular, the master system 201 phase compensates or otherwise adjusts the master clock pulse 10a based on a minimum time $T_{min}$ 41 and a predetermined expectancy time interval $T_{int}$ 44 of the slave system 202a, 202b, 202c, . . . , 202n to provide the phase-compensated master event start pulse 20 of the phase axis B.

This is done because in the master-slave asynchronous communication system 200, the master system 201 and each of its associated slave systems 202a, 202b, 202c, . . . , 202n may be linked by cable for varying distances, such as by an RS-485 twisted-pair cable for the asynchronous communication system 200. In particular, because of the varying distances between the master system 201 and each of its downstream slave systems 202a, 202b, 202c, ..., 202n, the master system 201, may use a suitably appropriate phase compensation system to phase compensate the master clock pulse 10a for any "cable delay", which may occur in any communicated information or signals among the master system 201 and the slave systems 202a, 202b, 202c, ..., 202n, as well as any other slave system processing delays or any other system delays. Accordingly, a total system delay time Δt (or other such information) may be provided to the master system 201 and each of the slave systems 202a, 202b, 202c, ..., 202n. This information may be provided, for example, by the system user. In particular, this total system delay time Δt corresponds to the cable and system delay of the downstream slave systems 202a, 202b, 202c, ..., 202n, a minimum time $T_{min}$ 41 of the predetermined expectancy time interval $T_{int}$ 44 and one-half of the predetermined expectancy time interval $T_{int}$ 44. Thus, as regards the master system 201, the master event start pulse 20a of the phase axis B may be phase compensated or time shifted with respect to the total system delay time Δt. In the master system 201, the master event clock pulse 10a may be phase compensated or time shifted using any suitably appropriate phase compensation system or technique, such as using a counter arrangement to phase, time shift, adjust or otherwise compensate the phase of the master event clock pulse 10a of the phase axis A to provide the phase compensated master event start pulse 20a of the phase axis B.

Next, on the phase axis C, which is labeled "Received Master Clock Pulse", the slave system 202a, 202b, 1202c, ..., 202n "receives" the communicated or transmitted master clock pulse 10a of the phase axis A as a received master clock pulse 30a of the phase axis C. As shown, the phase reference line 71 shows a slight system delay between the rising edge of the communicated master clock pulse 10a of the phase axis A and the rising edge of the received master clock pulse 30a, as received by the slave system 202a, 202b, 202c, ..., 202n of the phase axis C. As discussed, this is due to the slave system processing delays and the communication delays. The received master clock pulse 30a, as received by the slave system 202a, 202b, 202c, ..., 202n should always be synchronized with respect to the communicated master clock pulse 10a from the master system 201. The slave system 202a, 202b, 202c, ..., 202n synchronizes a generated or regenerated slave event start pulse 50a of the phase axis E with respect to the master event start pulse 20a of the phase axis B.

In this regard, on the phase axis D, which is labeled "Phase Measurement," the predetermined expectancy phase or time interval or window $T_{int}$ 44 is shown. The expectancy time interval or window $T_{int}$ 44 represents the maximum phase or timing error that may be acceptable for a particular application of the master-slave asynchronous communication system 200. The expectancy time interval $T_{int}$ 44 may be defined by the minimum time $T_{min}$ 41, an actual time $T_{act}$ 42 and a maximum time $T_{max}$ 43. The minimum time $T_{min}$ 41 corresponds to the amount of time or the number of slave system clock cycles that may be required for the slave system 202a, 202b, 202c, ..., 202n to "recognize" that it has acquired or received the communicated master clock pulse 10a of the phase axis A as the received master clock pulse 30a of the phase axis C. Also, the actual time $T_{act}$ 42 corresponds to the difference between the starting of an actual time $T_{act}$ counter, which occurs when the slave system 202a, 202b, 202c, ..., 202n receives the communicated master clock pulse 10a of the phase axis A as the received master clock pulse 30a of the phase axis C, and the ending of the actual time $T_{act}$ count. This occurs when the slave system 202a, 202b, 202c, ..., 202n first generates (or regenerates) the unsynchronized slave event start pulse 50a of the phase axis E for its slave event. Thus, the expectancy time interval or window $T_{int}$ 44 corresponds to the difference between the minimum time $T_{min}$ 41 and the maximum time $T_{max}$ 42, and therefore corresponds to the clock difference or "jitter". This clock "jitter" (which may be on the order of about a few nanoseconds) among the master system 201 and the slave systems 202a, 202b, 202c, ..., 202n may occur in the master-slave asynchronous communication system 200, and corresponds to the phase error that a system designer may be willing to accept based on the particular system requirements of a particular application.

Also, each of the one or more slave systems 202a, 202b, 202c, ..., 202n may use a suitably appropriate time interval determining system 40 (whether hardware, firmware or software, or some combination thereof) to generate the time interval or window $T_{int}$ 44. Using hardware, for example, the time interval determining system 40 may be clock-based, and may, for example, include three counter systems so that a first counter system may be used for the minimum time $T_{min}$ 41, a second counter system may be used for the actual time $T_{act}$ 42 and a third counter system may be used for the maximum time $T_{max}$ 43. Each of the counter systems, of course, may include one or more sub-counters depending on the data or timing resolution requirements of the particular application.

Next, as discussed, on the phase axis E, which is labeled "Slave Event Start Pulse", the slave system 202a, 202b, 202c, ..., 202n may generate the slave event start pulse 50a for the slave event that is synchronized with respect to the communicated or transmitted master clock pulse 10a of the phase axis A and to the phase compensated master event start pulse 20a of the phase axis B of the master system 201. The slave event start pulse 50a for the slave event may be based on a running slave clock cycle of a base or reference clock in the slave system 202a, 202b, 202c, ..., 202n. In this regard, each slave system 202a, 202b, 202c, ..., 202n has its own base or reference clock, such as a 4 MHz base or reference clock. Accordingly, if the running slave clock cycle is phase or time shifted using any suitably appropriate clock phase shifting system 80 (whether hardware, firmware or software, or some combination thereof), this will correspondingly phase or time shift the slave event start pulse 50a of the phase axis E for the slave event. In this way, the slave event start pulse 50a of the slave system 202a, 202b, 202c, ..., 202n may be phase compensated or time shifted into the time expectancy interval $T_{int}$ 44, which, as discussed, corresponds to the maximum amount of clock "jitter" that may be acceptable for a particular system application.

The slave system 202a, 202b, 202c, ..., 202n may use any suitably appropriate phase clock regulator system 80 that regulates the phase of the base or reference clock of the slave system 202a, 202b, 202c, ..., 202n so as to phase compensate or time shift the base or reference clock cycle by a phase adjustment variable 62. In this way, the slave event start pulse 50a of the phase axis E may be phase or time shifted until it occurs within the expectancy time interval or window $T_{int}$ 44, and is thus synchronized with respect to the phase compensated master event start pulse 20a of the phase axis B and to the communicated master clock pulse 10a of the phase axis A. In particular, using any such suitably appropriate clock phase regulator system 80, the slave system 202a, 202b, 202c, ..., 202n may use the clock phase regulator system 80, which receives the unregulated slave base or reference clock cycle and the actual time $T_{act}$ 42 from the $T_{act}$ counter. The clock phase regulator system 80 may then determine whether the actual time $T_{act}$ 42 may be greater than the minimum time $T_{min}$ 41 from the $T_{min}$ counter, and also whether the actual time $T_{act}$ 42 may be less than the maximum time $T_{max}$ 43 from the $T_{max}$ counter. If the clock phase regulator system 80 of the slave system 202a, 202b, 202c, . . . , 202n determines that the actual time $T_{act}$ 42 occurs inside the "jitter" or expectancy time interval $T_{int}$ 44, then the clock phase regulator system 80 does not phase or time shift the base or reference clock cycle. If, however, the clock phase regulator system 80 of the slave system 202a, 202b, 202c, . . . , 202n determines that the actual time $T_{act}$ 42 occurs outside the "jitter" or time interval or window $T_{int}$ 44, then the clock phase regulator system 80 phase or time shifts the base or reference clock cycle so as to time or phase shift the slave event start pulse 50a of the phase axis E of the slave event. In this way, the slave event start pulse 50a of the phase axis E of the slave event in each slave system 202a, 202b, 202c, . . . , 202n may be separately synchronized with respect to the phase compensated master event start pulse 20a of the phase axis B and to the communicated master clock pulse 10a of the phase axis A.

Figure 1A:
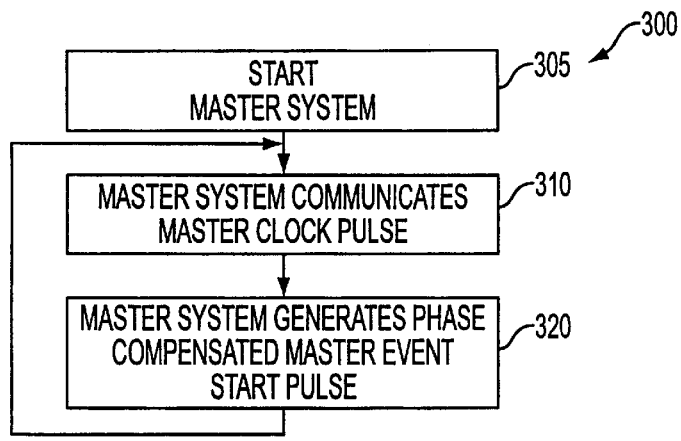
FIG. 1A shows a logic flow chart illustrating a method concerning the master clocking signals, which are used in the method of FIG. 1B.
Figure 1B:
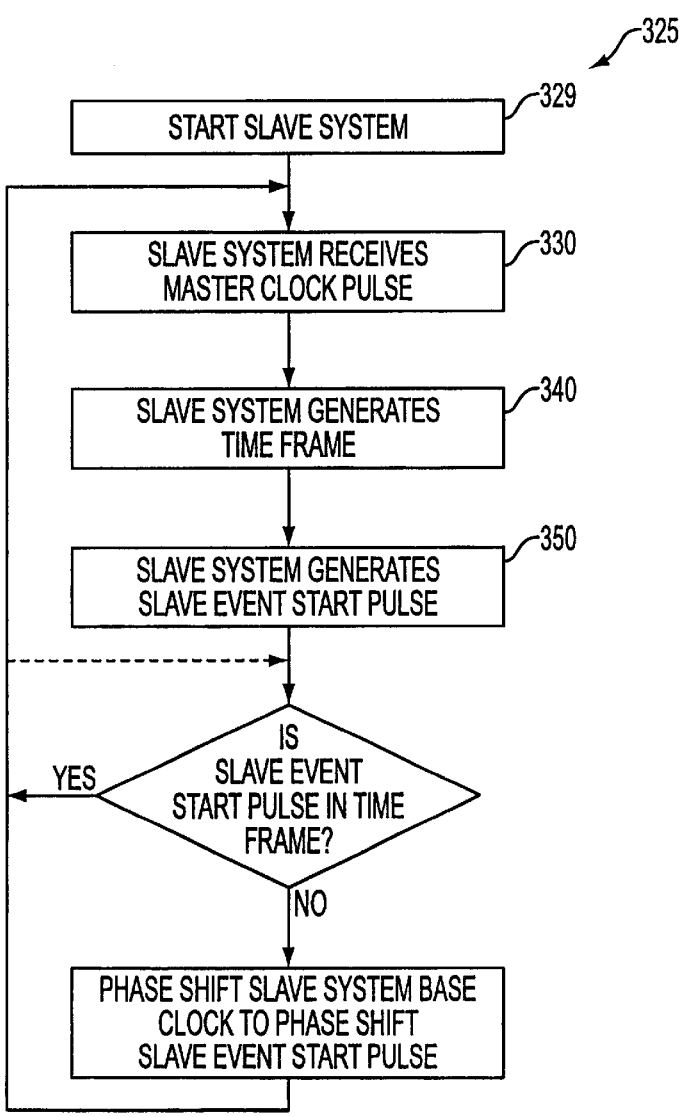
FIG. 1B shows a logic flow chart illustrating a method for monitoring the master clocking signals of FIG. 1A, and for synchronizing slave event clock signals with respect to the master event clock signals in a master-slave asynchronous communication system.

The logic and method of the present system are shown in the logic and method flowcharts 300 and 325 of FIG. 1A and FIG. 1B, respectively. In the logic and method flowchart of FIG. 1A, following the start of the master system 201 in step 305, the master system 201 may use its master clock in step 310 to generate the master clock pulse 10a of the phase axis A. This may be done to initiate some activity, event or operation at the master system 201 and one or more of the slave systems 202a, 202b, 202c, . . . , 202n. Next, in step 320, the master system 201 may use its on master clock pulse 10a of the phase axis A to generate or regenerate the phase compensated master event start pulse 20a of the phase axis B. The master event start pulse 20a may be phase compensated or time shifted with respect to the master clock pulse 10a based on the minimum time $T_{min}$ 41 and the predetermined expectancy time interval $T_{int}$ 44 of the slave system 202a, 202b, 202c, . . . , 202n. Thereafter, step 320 loops back to step 310.

In FIG. 1B, the method slave system begins or starts in step 329. In step 330, the slave system 202a, 202b, 202c, . . . , 202n receives the communicated master clock pulse 10a of the phase axis A as the received master clock pulse 30a of the phase axis C. The "received" master clock pulse 30a may, of course, be regenerated from the communicated master clock pulse 10a of the phase axis A. As discussed, there may be a slight master-slave asynchronous communication system delay between the communicated master clock pulse 10a of the phase axis A and the received master clock pulse 30a of the phase axis C, as received or regenerated by the slave system 202a, 202b, 202c, . . . , 202n. Also, as discussed, this may be due to the slave system processing delays and the associated communication delays of the master-slave asynchronous communication system 200. The received master clock pulse 30a, as received by the slave system 202a, 202b, 202c, . . . , 202n should always be synchronized with respect to the communicated master clock pulse 10a of the master system 201. The slave system 202a, 202b, 202c, . . . , 202n synchronizes its received master clock pulse 30a of the phase axis C with respect to the communicated master clock pulse 10a of the phase axis A and to the phase compensated master event start pulse 20A of the phase axis B.

In this regard, in step 340, using the timer interval generating system 40, the slave system 202a, 202b, 202c, . . . , 202n may generate or otherwise provide the expectancy time interval or window $T_{int}$ 44, which represents the maximum phase or timing error that may be acceptable for a particular application of the master-slave asynchronous communication system 200. As discussed, the expectancy time interval or window $T_{int}$ 44 may be defined by the minimum time $T_{min}$ 41, the actual time $T_{act}$ 42 and the maximum time $T_{max}$ 43. Also, as discussed, the time interval or window $T_{int}$ 44 corresponds to the difference between the time $T_{min}$ 41 and the maximum time $T_{max}$ 43, and therefore corresponds to the clock "jitter," which may be on the order of about a few nanoseconds) among the master system 201 and the slave systems 202a, 202b, 202c, . . . , 202n of the master-slave asynchronous communication system 200. If implemented as hardware, for example, the time interval generating system 40 may, for example, include three counter systems for use with a synchronizing system of the slave system 202a, 202b, 202c, . . . , 202n, in which a first counter system may be used for the minimum time $T_{min}$ 41, a second counter system may be used for the actual time $T_{act}$ 42 and a third counter system may be used for the maximum time $T_{max}$ 43. Each of the counter systems, of course, may include one or more sub-counters depending on the particular data or timing resolution requirements of the particular application.

Next, in step 350, the synchronizing system of the slave system 202a, 202b, 202c, . . . , 202n may generate the appropriate slave event start pulse 50a of the phase axis E for the slave event that must be synchronized with respect to the phase compensated master event clock pulse 20a of the phase axis B and to the communicated master clock pulse 10a of the phase axis A. The slave event start pulse 50a for the slave event may be based on the base or reference clock cycle of the slave system 202a, 202b, 202c, . . . , 202n. Accordingly, if the base or reference clock cycle of the slave system 202a, 202b, 202c, . . . , 202n is phase or time shifted by the clock phase regulator system 80, this will correspondingly phase or time shift the slave event start pulse 50a of the phase axis E for the slave event. In this way, the slave event start pulse 50a for the slave system 202a, 202b, 202c, . . . , 202n may be phase compensated or time shifted so that it may occur within the expectancy time interval or window $T_{int}$ 44. Also, as discussed, the actual time $T_{act}$ 42 corresponds to the difference between the starting of the actual time $T_{act}$ counter, which occurs at the phase reference line 71 when the slave system 202a, 202b, 202c, . . . , 202n receives the communicated master clock pulse 10a of the phase axis A, and the ending of the actual time $T_{act}$ 42, which occurs when the slave system 202a, 202b, 202c, . . . , 202n generates the unsynchronized slave event start pulse 50a of the phase axis E for the slave event.

As discussed, the slave system 202a, 202b, 202c, . . . , 202n has a base or reference clock, such as a 4 MHz base or reference clock, and the clock phase regulator system 80, which regulates the base or reference clock so as to phase compensate or time shift the base or reference clock cycle. This phase shift operation effectively phase compensates or time shifts the slave event start pulse 50a of the phase axis E so that it may occur within the expectancy time interval $T_{int}$ 44, and is therefore synchronized with respect to the phase compensated master event start pulse 20a of the phase axis B and to the communicated master clock pulse 10a of the phase axis A. Accordingly, in steps 360 and 370, the slave system 202a, 202b, 202c, . . . , 202n may use the clock phase regulator system 80, which receives the unregulated slave base or reference clock cycle and the actual time $T_{act}$ 42 from the $T_{act}$ counter. The clock phase regulator system 80 may then determine whether the slave event start pulse 50a of the phase axis E is within the expectancy time interval $T_{int}$ 44.

In particular, the clock phase regulator system 80 may determine whether the actual time $T_{act}$ 42 may be greater than the minimum time $T_{min}$ 41, which may be provided by the $T_{min}$ counter, and it also may determine whether the actual time $T_{act}$ 42 may be less than the maximum time $T_{max}$ 43, which may be provided by the $T_{max}$ counter. Thus, if the clock phase regulator system 80 of the slave system 202a, 202b, 202c, ..., 202n determines that the actual time $T_{act}$ 42 occurs outside the "jitter" or expectancy time interval $T_{int}$ 44, then the clock phase regulator system 80 phase or time shifts the base or reference clock cycle of the slave system 201 a, 202b, 202c, ..., 202n to effectively phase or time shift the slave event start pulse 50a of the phase axis E of the slave event. If, however, the clock phase regulator system 80 of the slave system 202a, 202b, 202c, ..., 202n determines that the actual time $T_{act}$ 42 occurs inside the "jitter" or time interval $T_{int}$ 44, then the clock phase regulating system 80 does not phase or time shift the base or reference clock cycle of the slave system 201a, 202b, 202c, ..., 202n. In this way, the slave event start pulse 50a of the slave in the slave system 202a, 202b, 202c, ..., 202n may be separately synchronized with respect to the phase compensated master event clock pulse 20a of the phase axis B and to the communicated master clock pulse 10a of the phase axis A. For a "smoother" phase shift, steps 360 and 370 may return to step 330. For a "rougher" phase shift, steps 360 and 370 may return to the end of step 350.

Figure 4:
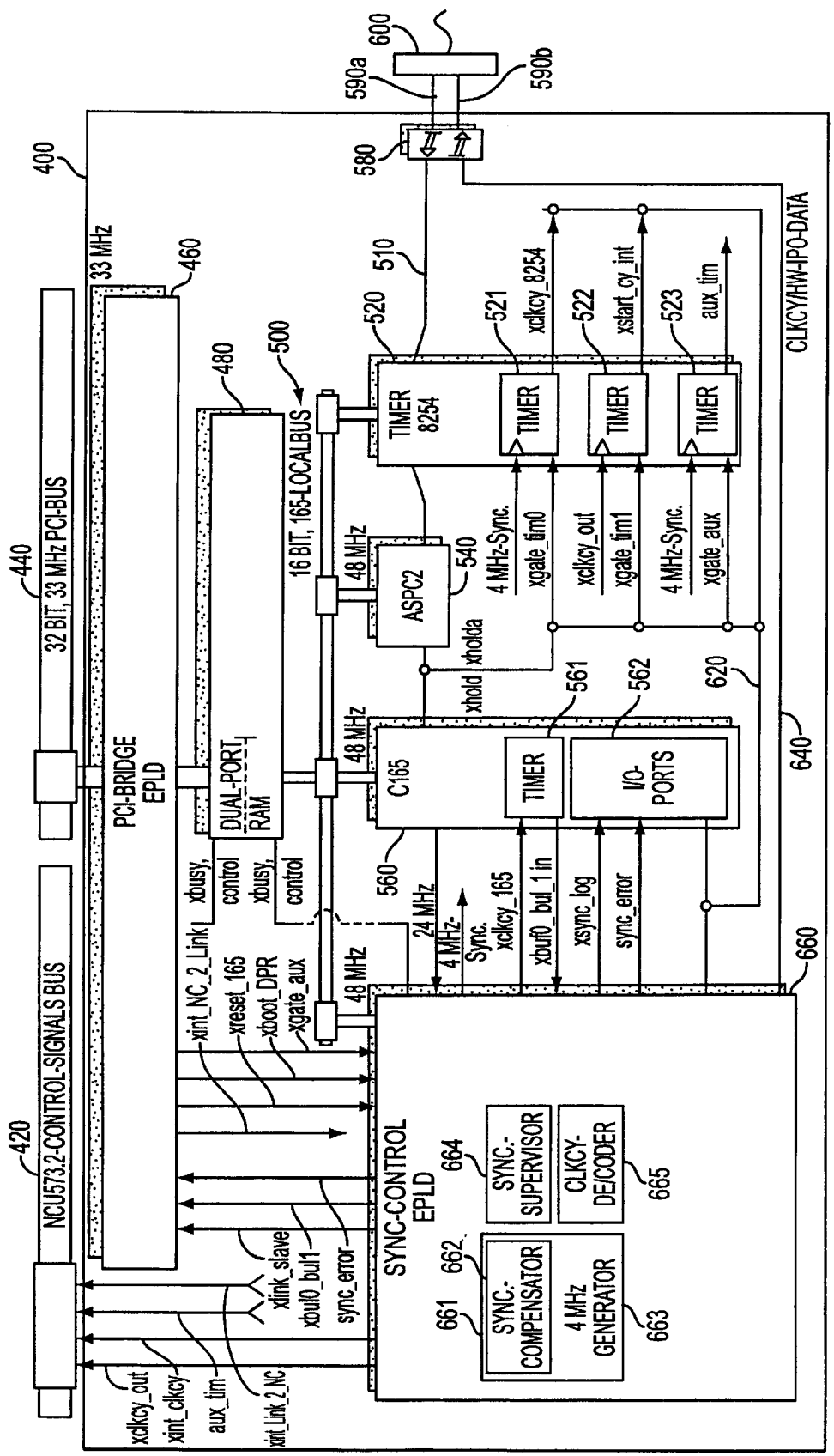
FIG. 4 shows an exemplary embodiment of the present system, as implemented in a numerical controller link module for coupling a slave numerical controller unit to a master numerical controller unit using a master-slave asynchronous communication system.

An exemplary application and exemplary embodiment of the present invention are shown in FIG. 4. In particular, FIG. 4 shows a numerical controller unit ("NCU") link module 400 for linking a slave numerical controller unit and a distributed peripheral ("DP") version of the PROFIBUS asynchronous communication system 200, which may have a master system 201 including a master numerical controller unit. Examples of a PROFIBUS communication protocol chip that may be used with the numerical controller unit link module 400 (depending on the application) may include, for example, various peripheral PROFIBUS protocol chips, such as the ASPC2 or the ASPC2-E step, the SPC3, the SPC4 and the DPC31, as well as single peripheral PROFIBUS protocol chips, such as the SPM2 and the LSPM2. Additionally, since the ASPC2-E step chip provides clock pulse capabilities, an additional slave pulse line 640 is not required, as shown, for example, in the exemplary embodiment of FIG. 4. These PROFIBUS communication protocol chips are available from Siemens AG, located in Munich, Germany.

As shown, the numerical controller unit link module 400 may include an EPLD-based synchronization control and processor module 660, a processor 560 (which may be a 48 MHz C165 microcontroller, and which is also available from Siemens AG of Munich, Germany), a communication protocol chip 540 (which may be a 48 MHz ASPC2 PROFIBUS protocol chip, and which is available from Siemens AG of Munich, Germany), a timer chip 520 (which may be an 8254 timer chip) having three timers 521, 522 and 523, a dual port ram 480, a numerical controller unit control signal bus 420 (type "573.2") for interfacing to the slave numerical controller unit, an EPLD-based peripheral component bridge interface 460 ("PCI-Bridge") and a corresponding 32-bit PCI-bus, which is capable of 33 MHz operations, for interfacing with a peripheral computer or other peripheral components. Additionally, the synchronization control and processor module 660, the processor 560, the communication protocol chip 540 and the timer chip 520 are all coupled using a 16-bit local bus 500 (type "C165"). The synchronization control and processor module 560 has an additional slave pulse control line 640, which is labeled CLKCY/HW-IPO-Data. This may be used because the communication protocol chip 540 (as shown) does not provide the required clock pulse capabilities. Finally, the communication protocol chip 540 may be coupled by a communication data line 510 to a communication cable 590, including communication cable segments 590a and 590b. The communication cable 590 may be an RS-485 based twisted line pair for providing serial asynchronous communications between the master system 201 and the numerical controller unit link module 400 of the slave system 202.

The EPLD-based PCI-Bridge 460 couples the PCI-bus 440 and the dual port RAM 480 of the numerical controller unit link module 400. Although not shown, the EPLD-based PCI-Bridge 460 includes a status register block, a command register block, a state-machine register block for read and write operations, a state machine logic block (which may be based in static RAM) for transferring PCI-sourced data or information to the synchronization control and processor module 660, and a chip enable/output enable logic block for controlling read and write operations in the dual port RAM 480. The PCI-Bridge 460 provides bridge or interface logic to interface the numerical controller unit link module 400 to the PCI bus 440. The dual port RAM 480 includes two 16K memory buffers and a 32K of fixed location RAM memory. The dual port RAM 480 also has two "xbusy" control lines, one of which may be coupled to the EPLD-based PCI-Bridge 460 and one of which may be coupled to the EPLD-based synchronization control and processor module 660.

The processor 560 may be any suitably appropriate microcontroller or other suitably appropriate processor logic, including microcontrollers, microprocessors and ASIC-based processing logic, as well as any other suitably appropriate logic or processor system. In the exemplary embodiment of FIG. 4, the processor 560 may be a 48 MHz C165 microcontroller, which is available from Siemens AG in Munich, Germany. The processor 560 includes a dual timer 561 and various static RAM based I/O ports 562. The processor 560 may be used to initialize the communication protocol chip 540 by copying or downloading the PROFIBUS protocol information into the communication protocol chip 540. The processor 560 receives a clock cycle control signal xclkcy_165, a control signal xsync_po, and a synchronization error signal sync_error, and supplies a 24 MHz clocking signal to the EPLD-based synchronization control and processor module 660, and also couples control signals xhold and xholda among the communication protocol chip 540 and the EPLD-based synchronization control and processor module 660.

The timer chip 520 includes 3 timers, including the auxiliary timer 523, which provides an auxiliary timer output signal aux_tim, the clock cycle timer 521, which provides a clock cycle output signal xclkcy, and the start cycle interrupt timer 522, which provides an output signal xstartcy_int. The timer 520 may be coupled by a communication data line 510 to a communication interface 580, which allows serial communication of CRC-encoded information through the communication cable 590 (RS-485 based twisted line pair) with the master system 201. The timer 521 receives a 4 MHz base or reference clock signal from the EPLD-based synchronization control and processor module 660, and receives control signal xgate_time and outputs control signal xclkcy_8254. The tinier 521 also receives the 4 MHz base or reference clock from the EPLD-based synchronization control and processor module 660, and receives control signal xgate_time and outputs clock cycle signal xclkcy_8254. The timer 521 receives the 4 MHz base or reference clock signal from the EPLD-based synchronization control and processor module 660, and receives control signal xgate_time and outputs clock cycle signal xclkcy_8254.

Although not shown, the synchronization control and processor module 660 also includes an address-multiplexer logic block, an "identifier" logic block, a chip enable/output enable logic block, a "ready" logic block, a filter block, a "glue" logic block, an IPO/interrupt cycle block and a timer gate block. The address-multiplexer block may be used to coordinate addressing and multiplexing of data and information handled by the synchronization control and processor module 660. The "identifier" block includes code to "identify" the numerical controller unit link module 400 to the slave numerical controller unit and to the PCI-bus 440. The chip enable/output enable logic block may be used to control read/write operations, such as addressing certain memory locations, in the dual port RAM 480 of the numerical controller unit link module 400. Also, the ready logic block makes the remainder of the numerical controller unit link module 400 "wait" until the synchronization control and processor module 660 is ready. The filter block may be a digital filter that may be used to filter the signals received by the synchronization control and processor module 660. The "glue" logic block may use AND/OR address decode logic, which may be used to control input to and output from the synchronization control and processor module 660. The hardware-based IPO/interrupt cycle block is for numerical controller unit operation and provides certain "interpolated" clock signals to the slave numerical controller unit. As discussed, the CLKCY/HW_IPO_Data signal line 640 between the synchronizing control and processor module 660 and the communication interface 580 is not needed if an ASPC2-Estep PROFIBUS protocol chip is used. The timer gate logic block controls the timer chip 520, and therefore controls the initial phase of the slave event start pulse 50a for the slave event. It is believed that these logic blocks only concern peripheral aspects of the exemplary application of FIG. 4 corresponding to the exemplary embodiments of the apparatuses, methods and systems.

The EPLD-based synchronization control and processor module 660 outputs control signals xclkcy_out and xint_clkcy to the numerical controller unit control signal bus 420, and also outputs control signals xlink_slave, xbuf0_buf1 and sync_error to the EPLD-based PCI-Bridge 460. Additionally, the EPLD-based synchronization control and processor module 660 receives control signals xreset_165, xboot_DPR and xgate_aux from the EPLD-based PCI-bridge 460, and control signal xbuf0_buf1_in from the processor 560. Also, the numerical controller unit control signal bus 420 receives the auxiliary timer control signal aux_tim from the timer 520 and the interrupt signal xint_link_2_nc from the EPLD-based PCI-Bridge 460.

Importantly, the synchronization control and processor module 660 includes a synchronization compensator and slave clock block 661, which may include a synchronization compensator logic block 662 and a 4 MHz base or reference clock generator 663. The synchronization control and processor module 660 also includes a synchronization supervisor logic block 664 and a clkcy-coder/decoder logic block 665. As discussed, the synchronization control and processor module 660 includes a base or reference 4 MHz clock, the output of which is input to the clock cycle timer 521 and the auxiliary timer 523 of the timer chip 520. In the synchronization control and processor module 660, the synchronization supervisor 664 may be used to determine whether any communicated master clock pulse 10a has been received, and, if it has, the synchronization supervisor 664 sends an appropriate operating instruction to the slave numerical controller unit using the control signal bus 420. The clock cycle coder/decoder logic block 665 may be used because the communication protocol chip 540 does not generate the required start pulse for the numerical controller unit link module 400. Accordingly, the clock cycle coder/decoder may be used to decode the cyclic redundancy check ("CRC") encoded and communicated master clock pulse 10a, which may be received by the numerical controller unit link module 400 of the slave system 202 from the master system 201, and to generate a slave event start pulse 50a for the corresponding slave event. Finally, the synchronizing compensator block 661, including the synchronization compensation logic block 662, may be used to initialize the system as a master system (which uses the logic and method of FIG. 1A) or as a slave system (which uses the logic and/or method of FIG. 1B) and to implement the logic, phase and timing of FIG. 2, which was discussed above.

The embodiment of FIG. 4 is only an exemplary application, and other applications may of course differ in their specific implementation. For example, other exemplary applications may include the use of one or more slave motor drives having a synchronization chip or module for synchronizing each slave drive or drives to the master system.

What is claimed is:

1. A method for synchronizing a slave system and a master system, the method comprising the steps of:
   providing a slave clock signal based on a communicated master clock signal;
   providing a time frame in the slave system, wherein the time frame is defined by a minimum time and a maximum time, and a phase of the slave clock signal corresponds to an actual time;
   determining if the slave clock signal is in the time frame; and
   regulating the slave clock signal, if it is not in the time frame, so that the slave clock signal occurs within the time frame.

2. The method of claim 1, wherein the step of regulating includes the step of phase shifting the slave clock signal so that it occurs after the minimum time and before the maximum time.

3. The method of claim 2, wherein the determining step includes the step of determining whether the actual time is no greater than the minimum time, if the slave clock signal is not in the time frame, and wherein the regulating step includes the step of phase shifting the slave clock signal in one direction, if the actual time is no greater than the minimum time, and phase shifting the slave clock signal in another direction, if the actual time is greater.

4. The method of claim 1, wherein the slave clock signal is a slave clock pulse.

5. The method of claim 1, further comprising the steps of:
   providing a master clock signal; and
   communicating the master clock signal to the slave system so as to provide the communicated master clock signal.

6. The method of claim 5, further comprising the step of providing another master clock signal, wherein the step of providing the master clock signal is based on the another master clock signal.

7. The method of claim 5, further comprising the step of providing a master event start signal based on the master clock signal.

8. The method of claim 7, further comprising the step of phase compensating the master event start signal based on at least one of a communication delay, a system delay and the time frame.

9. The method of claim 7, wherein the master event start signal is a master event start pulse.

10. A method for synchronizing a slave system and a master system, the method comprising the steps of:
   providing a master clock signal in the master system;
   communicating the master clock signal to the slave system so as to provide a communicated master clock signal;
   providing a time frame in the slave system, wherein the time frame is defined by a minimum time and a maximum time;
   providing a slave clock signal based on the communicated master clock signal, wherein a phase of the slave clock signal corresponds to an actual time;
   determining if the slave clock signal is in the time frame;
   determining if the actual time is no greater than the minimum time, if the slave clock signal is not in the time frame; and
   regulating the slave clock signal, if it is not in the time frame, by phase shifting the slave clock signal so that it occurs after the minimum time and before the maximum time in the time frame.

11. The method of claim 10, wherein the slave clock signal is phase shifted in one direction, if the actual time is no greater than the minimum time, and is phase shifted in another direction if the actual time is greater.

12. The method of claim 10, wherein the slave clock signal is a slave clock pulse.

13. The method of claim 10, further comprising the step of providing another master clock signal, wherein the step of providing the master clock signal is based on the another master clock signal.

14. The method of claim 10, further comprising the step of providing a master event start signal based on the master clock signal.

15. The method of claim 14, wherein the master event start signal is phase compensated based on at least one of a communication delay, a system delay and the time frame.

16. The method of claim 14, wherein the master event start signal is a master event start pulse.

17. A system for synchronizing a slave system and a master system, the synchronizing system comprising:
   a first generator that generates a time frame, wherein the time frame is defined by a minimum time and a maximum time;
   a second generator that generates a slave clock signal based on a communicated master clock signal, wherein a phase of the slave clock signal corresponds to an actual time;
   a processor that determines if the slave clock signal is in the time frame; and
   a regulator that regulates the slave clock signal, if it is not in the time frame, so that the slave clock signal occurs within the time frame.

18. The system of claim 17, wherein the regulator phase shifts the slave clock signal so that it occurs after the minimum time and before the maximum time.

19. The system of claim 18, wherein the processor determines whether the actual time is no greater than the minimum time, if the slave clock signal is not in the time frame, and wherein the regulator phase shifts the slave clock signal in one direction, if the actual time is no greater than the minimum time, and phase shifts the slave clock signal in another direction, if the actual time is greater.

20. The system of claim 17, wherein the slave clock signal is a slave clock pulse.

21. The system of claim 17, further comprising a third generator that generates a master clock signal, and a communicating apparatus that is adapted to communicate the master clock signal to the slave system so as to provide the communicated master clock signal.

22. The system of claim 21, further comprising a fourth generator that generates another master clock signal, wherein the master clock signal is based on the another master clock signal.

23. The system of claim 21, further comprising a fifth generator that generates a master event start signal based on the master clock signal.

24. The system of claim 23, wherein the fifth generator phase compensates the master event start signal based on at least one of a communication delay, a system delay and the time frame.

25. The system of claim 24, wherein the master event start signal is a master event start pulse.

26. A system for synchronizing a slave system and a master system, the synchronizing system comprising:
   means for providing a slave clock signal based on a communicated master clock signal, wherein a phase of the slave clock signal corresponds to an actual time;
   means for providing a time frame, wherein the time frame is defined by a minimum time and a maximum time;
   means for determining if the slave clock signal is in the time frame; and
   means for regulating the slave clock signal, if it is not in the time frame, so that the slave clock signal occurs within the time frame.

27. The system of claim 26, wherein the means for regulating regulates a slave reference clock so that the slave clock signal occurs within the time frame.

28. The system of claim 27, wherein the means for regulating also phase shifts the slave clock signal so that it occurs after the minimum time and before the maximum time.

29. The system of claim 28, wherein the means for determining determines whether the actual time is no greater than the minimum time, if the slave clock signal is not in the time frame, and wherein the means for regulating phase shifts the slave clock signal in one direction, if the actual time is no greater than the minimum time, and phase shifts the slave clock signal in another direction, if the actual time is greater.

30. The system of claim 26, wherein the slave clock signal is a slave clock pulse.

31. The system of claim 26, further comprising means for providing a master clock signal, and means for communicating the master clock signal to the slave system so as to provide the communicated master clock signal.

32. The system of claim 31, further comprising means for generating another master clock signal, wherein the master clock signal is based on the another master clock signal.

33. The system of claim 31, further comprising means for generating a master event start signal based on the master clock signal.

34. The system of claim 33, wherein the means for generating a master event start signal also phase compensates the master event start signal based on at least one of a communication delay, a system delay and the time frame.

35. The system of claim 34, wherein the master event start signal is a master event start pulse.

36. A system for synchronizing a slave system and a master system, the system comprising:
- a first generator that generates a master clock signal in the master system;
- a communication apparatus that is adapted to communicate the master clock signal to the slave system so as to provide a communicated master clock signal;
- a second generator that generates a time frame in the slave system, wherein the time frame is defined by a minimum time and a maximum time;
- a third generator that generates a slave clock signal based on the communicated master clock signal, wherein a phase of the slave clock signal corresponds to an actual time;
- a processor that determines if the slave clock signal is in the time frame, and that determines if the actual time is no greater than the minimum time if the slave clock signal is not in the time frame; and
- a regulator that regulates the slave clock signal, if it is not in the time frame, by phase shifting the slave clock signal so that it occurs after the minimum time and before the maximum time in the time frame.

37. A system for synchronizing a slave system and a master system, the system comprising:
- means for providing a master clock signal in the master system;
- means for communicating the master clock signal to the slave system so as to provide a communicated master clock signal;
- means for providing a time frame in the slave system, wherein the time frame is defined by a minimum time and a maximum time;
- means for providing a slave clock signal based on the communicated master clock signal, wherein a phase of the slave clock signal corresponds to an actual time;
- means for determining if the slave clock signal is in the time frame, and for determining if the actual time is no greater than the minimum time if the slave clock signal is not in the time frame; and
- means for regulating the slave clock signal, if it is not in the time frame, by phase shifting the slave clock signal so that it occurs after the minimum time and before the maximum time in the time frame.

* * * * *